United States Patent
Lautenschlager et al.

(10) Patent No.: US 6,321,096 B2
(45) Date of Patent: *Nov. 20, 2001

(54) METHOD OF CONTROLLING CALL ROUTING AND A COMMUNICATION TERMINAL

(75) Inventors: Wolfgang Lautenschlager, Weissach-Flacht; Uwe Stahl; Gerhard Tessmar, both of Leonberg, all of (DE)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/121,426

(22) Filed: Jul. 23, 1998

(30) Foreign Application Priority Data

Jul. 26, 1997 (DE) ................................. 197 32 294

(51) Int. Cl.[7] ................. H04B 1/38; H04Q 7/20
(52) U.S. Cl. ............... 455/553; 455/426; 455/552
(58) Field of Search ....................... 455/426, 553, 455/554, 560, 561, 465, 462, 461, 456, 552

(56) References Cited

U.S. PATENT DOCUMENTS

| 5,127,042 | 6/1992 | Gillig et al. . | |
|---|---|---|---|
| 5,260,988 | * 11/1993 | Schellinger et al. | 455/552 |
| 5,309,502 | * 5/1994 | Hirai | 455/426 |
| 5,509,062 | * 4/1996 | Carlsen | 379/210 |

(List continued on next page.)

FOREIGN PATENT DOCUMENTS

| 4307966 | 9/1994 | (DE) . |
|---|---|---|
| 4343335 | * 6/1995 | (DE) . |
| 4344702 | * 7/1995 | (DE) . |
| 19532069 | 1/1997 | (DE) . |
| 19537087 | 4/1997 | (DE) . |
| 196505223 | * 8/1997 | (DE) . |
| 0297616 | 1/1989 | (EP) . |
| 0700227 | 3/1996 | (EP) . |
| 0717578 | * 6/1996 | (EP) . |
| 0738093 | 10/1996 | (EP) . |
| 0740482 | * 10/1996 | (EP) . |
| 9701918 | 1/1997 | (WO) . |
| 9711567 | 3/1997 | (WO) . |

OTHER PUBLICATIONS

"GSM und DECT in Dual–Mode–Handys" in Funkschau, 3/06, S. 22–7, s. insb. Ksp. "Technische Realisierung".

"Mobilität in privaten Telekommunikationsnetzwerken (PTN)".

D. Mosimann et al., In: tec 3/95 Das Technische Magazin von ascom, pp. 14–20.

Primary Examiner—Vivian Chang
Assistant Examiner—Charles Appiah
(74) Attorney, Agent, or Firm—Ware, Fressola, Van Der Sluys & Adolphson LLP; Francis J. Maguire, Jr.; Milton Oliver

(57) ABSTRACT

A communication terminal (MT) is equipped with a first communication unit (KOM1) for communicating with radio network base stations (DECTS) via a first radio interface (RI1), and with a second communication unit (KOM2) for communicating with a mobile radio network (MN) via a second radio interface (RI2). The terminal (MT) determines whether it has moved into the range covered by the radio network base stations. If it has moved into the range (RADECT) covered by a selected radio network base station (DECTS), it initiates a switch-over of the network-side routing of connection requests which are directed to the terminal (MT), and routes them via the selected radio network base station (DECTS). The initiation of the switch-over takes place by signalling the mobile radio network (MN).

5 Claims, 4 Drawing Sheets

U.S. PATENT DOCUMENTS

| | | |
|---|---|---|
| 5,675,629 | 10/1997 | Raffel et al. . |
| 5,774,805 * | 6/1998 | Zicker ................................... 455/426 |
| 5,774,806 * | 6/1998 | Tayloe et al. ......................... 455/427 |
| 5,890,064 * | 3/1999 | Widergren et al. .................. 455/445 |
| 5,901,357 * | 5/1999 | D'Avello et al. .................... 455/454 |
| 5,909,650 * | 6/1999 | Jonsson ................................. 455/461 |
| 5,920,815 * | 7/1999 | Akhavan ............................... 455/426 |
| 5,920,820 * | 7/1999 | Qureshi et al. ....................... 455/461 |
| 5,924,030 * | 7/1999 | Rautiola et al. ...................... 455/426 |
| 6,067,456 * | 5/2000 | Duran ................................... 455/461 |

* cited by examiner

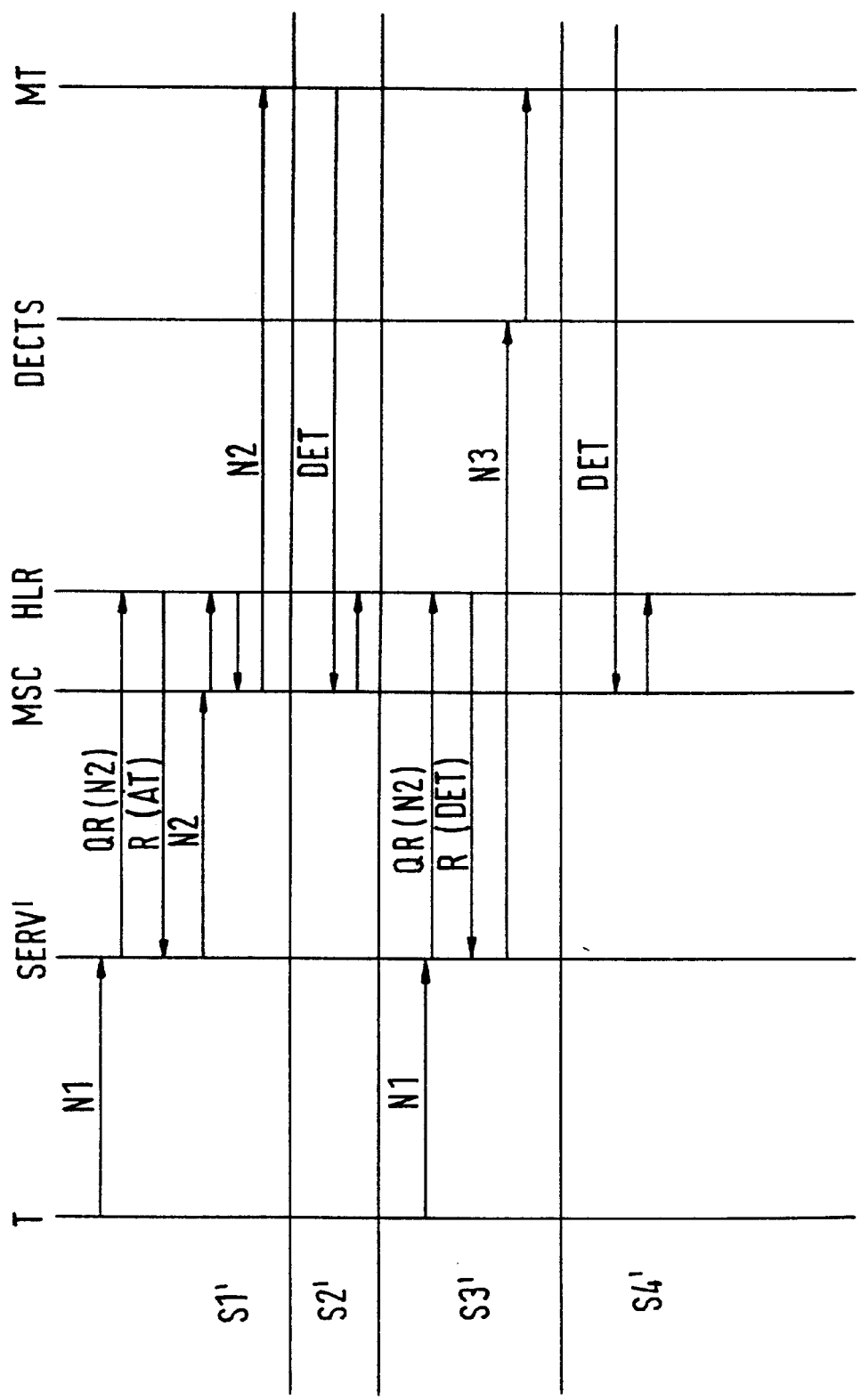

METHOD OF CONTROLLING CALL ROUTING AND A COMMUNICATION TERMINAL

BACKGROUND OF THE INVENTION

1. Technical Field

The invention concerns a method of controlling call routing through a communications network, and a communication terminal.

2. Discussion of Related Art

The invention starts with a communication system as described in EP 0738093. In this communication system a subscriber can be reached with a standardized call number, although he may have different types of communication terminals such as for example ISDN, GSM or DECT terminals, whereby he can be alternately reached.

A connection request directed to the subscriber is routed to a central network node of the communication system. This node translates the personal call number of the subscriber into the physical call number of the particular terminal for which the subscriber is registered. The connection is subsequently routed to the particular terminal for which the subscriber is registered.

In this case the registration takes place manually by the subscriber sending an explicit control message to the central node, or automatically through a DECT (Digital European Cordless Telephone) when the subscriber with his DECT terminal has moved into its covered range. The radio network base station of the DECT's access system detects the entrance of the DECT into its covered range and performs the registration in the central node.

A computer-controlled radio subscriber terminal which is suitable for operation in mobile radio networks with different system technologies, is known from EP 0297616 A1.

This subscriber radio terminal has two communication units. One of the communication units provides the means required to communicate via a first mobile radio network, and the other communication unit provides the means for communicating via a second, different type of mobile radio network. The subscriber radio terminal furthermore has an evaluation device which determines by means of the field strength of both mobile radio networks which one of the two communication units is activated and which one is blocked.

SUMMARY OF INVENTION

The object of the invention is to enable cost-effective communication with a mobile subscriber. This object is achieved by a method of controlling the call routing according to the principle of the method of the invention, and by a communication terminal according to the invention.

The invention is based on the idea of providing a communication terminal with an interface to a mobile radio network and to radio network base stations, which controls the network-side routing of connection requests directed to the terminal, by signalling the mobile radio network. On the one hand this has the advantage that a mobile subscriber can be reached through his call number via the most cost-effective access network, and on the other that the network-side cost of introducing this service feature is very small.

Thus, according to a first aspect of the invention, a method of controlling call routing via a communications network to a communication terminal, which is suitable for communicating in a first mode via a first radio interface with radio network base stations of the communications network, particularly with DECT stations, and for communicating in a second mode via a second radio interface with a mobile radio network of the communications network, is characterized in that the terminal determines whether it has moved into the range covered by radio network base stations, and that the terminal, if it has moved into the range covered by a selected radio network base station, initiates a switch-over of the network-side routing of connection requests, which are directed to the terminal, and routes them via the selected radio network base station by signalling the mobile radio network.

According to a second aspect of the invention, a communication terminal with a first communication unit for communicating with radio network base stations, particularly with DECT stations, via a first radio interface, is characterized in that the communication terminal is provided with a second communication unit for communicating with a mobile radio network via a second radio interface, and that the communication terminal is provided with a radio field evaluation device for ascertaining the range covered by radio network base stations, and with a control unit which is designed so that, if the terminal has moved into the range covered by a selected radio network base station, it initiates a switch-over of the network-side routing of connection requests which are directed to the terminal, and routes them via the selected radio network base station by signalling the mobile radio network.

It is particularly advantageous that the terminal controls the routing on the network-side by means of already existing signalling messages of the mobile radio network, for example through the signalling messages for attaching or detaching a terminal. This makes it possible that no intervention of any kind to the infrastructure on the network-side is required to carry out the invention. It merely requires a new type of terminal.

BRIEF DESCRIPTION OF THE DRAWINGS

The invention will be explained as an example in the following by means of two embodiments with the help of the attached drawings, where:

FIG. 3b is a time diagram of a connection to the communication terminal of the invention in accordance with a second embodiment.

DETAILED DESCRIPTION OF PREFERRED EMBODIMENTS

Figure 1:
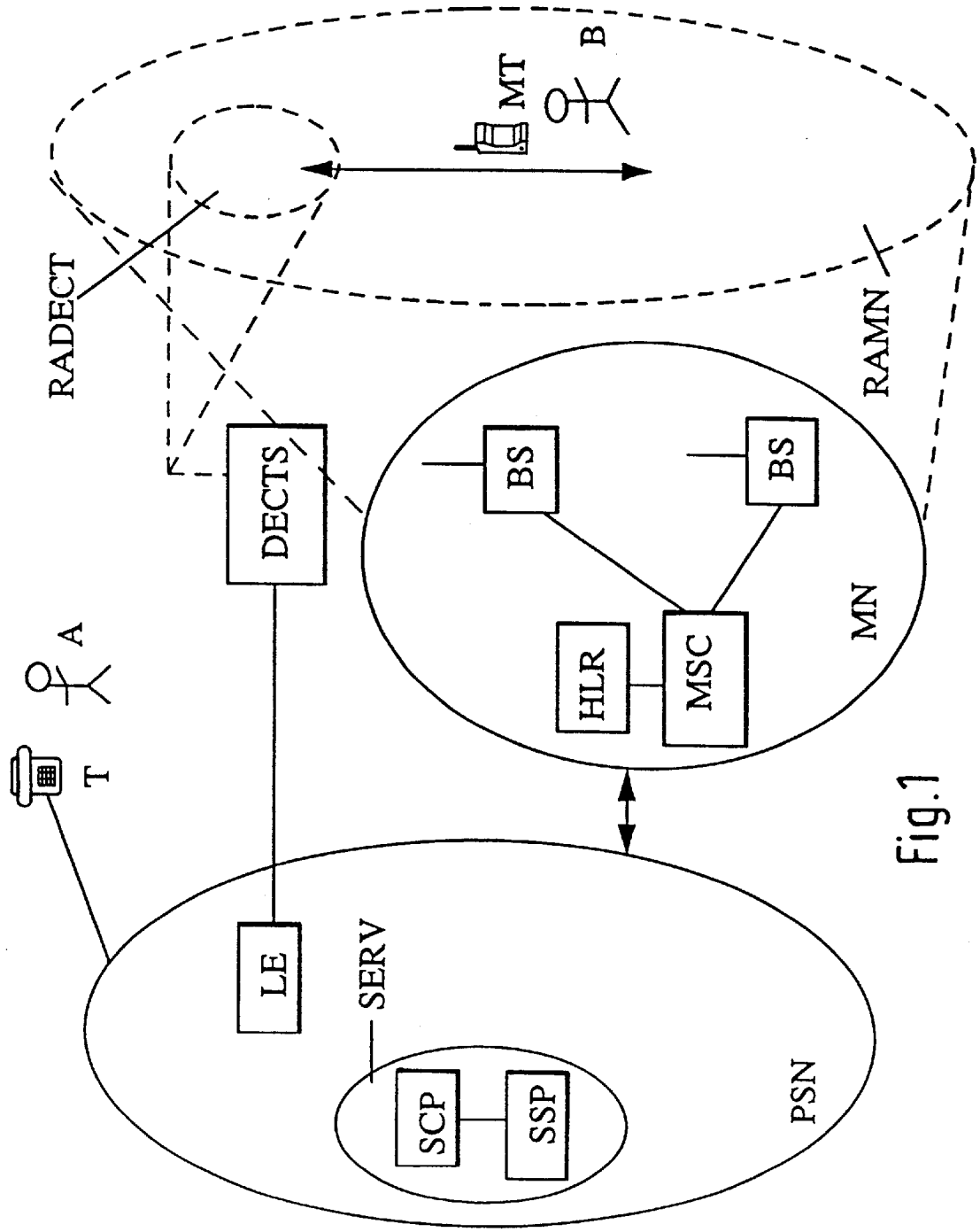
FIG. 1 is a block circuit diagram of a communication system with a communication terminal of the invention.

FIG. 1 illustrates a communication system with two communications networks PSN and MN, a radio network base station DECTS and two terminals T and MT to which a respective subscriber A or B is assigned. The radio network base station DECTS services a radio range RADECT, and the communications network MN services a radio range RAMN.

The communications network PSN is a public telephone network. The communications network MN is a mobile cellular radio network, for example according to the GSM (Global System for Mobile Communication) standard or any other comparable standard. At least one network gateway exists between the communications networks PSN and MN, so that connections can be established between the terminals of these networks.

It is also possible for the communications network PSN to comprise one or several private, or several interconnected private and public communications networks. It is furthermore possible for the communications network PSN to comprise partial networks which are assigned to different network operators. The mobile radio network MN can also comprise partial networks of different network operators.

Of the exchanges of the communications network PSN, only two exchanges SSP and LE are illustrated for example. The communications network PSN furthermore contains a service control device SCP.

The exchange LE represents a subscriber exchange to which the radio network base station DECTS is connected.

The exchange SSP represents a service exchange which, together with the service control device SCP, provides a service in the communications network PSN and thus forms a server unit SERV with the latter. In this case the exchange SSP and the service control device SCP operate in accordance with the IN (Intelligent Network) specification and are built according to this specification. Of course it is also possible for the server unit SERV to be built differently, for example by directly implementing the service logic into the control of an exchange in the communications network PSN.

Of the components of the mobile radio network MN, for example one mobile radio exchange MSC, one home data base HLR and two base stations BS are illustrated. The construction and interaction of these components can be found in the GSM standard for example.

The radio network base station DECTS is connected to the communications network PSN via at least one analog subscriber connection or ISDN (Integrated Services Digital Network), and in turn provides one or several terminals, for example terminal MT, a local access to the communications network PSN via a local radio interface. This access interface provided by the radio network base station DECTS is also called "cordless access". In this case it is possible for the radio network base station DECTS to comprise several spatially distributed radio transmitting and receiving units. It is furthermore possible for the radio network base station DECTS to provide the functions of a private branch exchange, thus enabling several terminals to access the communications network PSN via the radio interface under different branch exchange call numbers.

The radio network base station DECTS is preferably constructed in accordance with the DECT (Digital European Cordless Telephony) standard. But it is also possible for the radio network base station DECTS to be constructed in accordance with any other comparable standard.

The terminal T is a conventional telecommunication terminal, for example an analog telephone, an ISDN telephone, a fax machine or a computer with a corresponding communication card.

Figure 2:
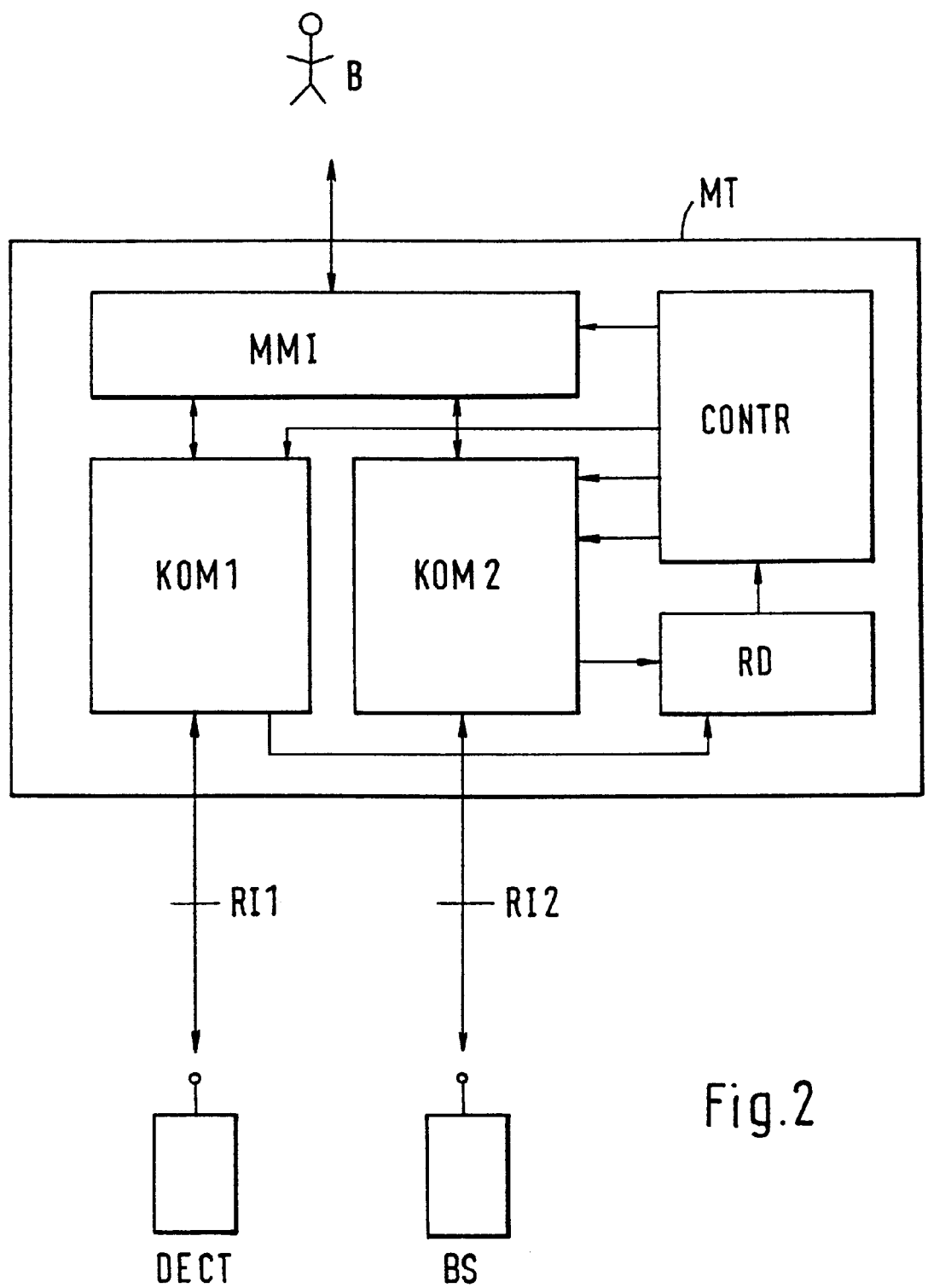
FIG. 2 is a more detailed block circuit diagram of the communication terminal of the invention in FIG. 1.

The terminal MT is a specially configured terminal which will be described in the following by means of FIG. 2. FIG. 2 illustrates the communication terminal MT, subscriber B, the radio network base station DECTS and base station BS. The terminal MT comprises an input and output unit MMI for subscriber B, two communication units KOM1 and KOM2, a radio field evaluation unit RD and a control unit CONTR. The communication units KOM1 and KOM2 exchange data with the radio network base station DECTS or the base station BS via a radio interface RI1 or RI2.

The communication unit KOM1 is activated/deactivated by control commands from the control unit CONTR and contains the software and hardware components required to establish a communication connection to the radio network base station DECTS, and to exchange data via such a communication connection. Thus it has, among other things, a radio transmitter and receiver in the corresponding frequency band, and protocol processing units for developing the respective communication protocols. The construction and operation of these components can be found in the DECT standard for example.

The construction of the communication unit KOM2 for communication with the mobile radio network MN is analogous to that of communication unit KOM1. The construction and operation of the components of communication unit KOM2 can be found in the GSM standard for example.

The input and output unit MMI is used jointly by both communication units KOM1 and KOM2 and provides a sound transducer, a keyboard and a display as the input and output means for subscriber A. The input and output unit MMI may only contain a selection of these means, but it can also contain further means, for example to implement a video telephone. By means of control commands from the control unit CONTR, these input or output means are either assigned to the communication unit KOM1 or to the communication unit KOM2.

The radio field evaluation unit RD is used to ascertain ranges which are covered by radio network base stations. To that end it determines the radio field strength in the respective frequency range by using components of the communication unit KOM1. Furthermore, if the radio field strength exceeds a predetermined minimum magnitude, it also determines an identification assigned to the emitting radio network base station by evaluating the radio signals. The radio field evaluation unit RD further determines whether the radio field strength of a selected radio network base station falls below a predetermined minimum value, and then signals this to the control unit CONTR.

The control unit CONTR controls the communication units KOM1 and KOM2 as well as the input and output unit MMI. By means of the radio field evaluation unit RD, the control unit determines whether the terminal has moved into the range covered by a selected radio network base station, by comparing the identification of the emitting radio network base station determined by the radio field evaluation unit, with the list of selected radio network base stations.

It is also possible for the control unit to determine a selected radio network base station by attempting through the communication unit KOM1 to authorize the terminal MT with respect to the radio network base station, where a selected radio network base station is such a station that authorizes the terminal MT.

If the control unit CONTR ascertains that the terminal MT has moved into the range covered by a selected radio network base station, it causes the network-side routing of connection requests directed to the terminal MT to be switched over to the ascertained selected radio network base station, by sending signalling messages to the mobile radio network MN via the radio interface RI2. In this case the actual transmission of these signalling messages is carried out by components of the communication unit KOM2, which are controlled by the control unit CONTR.

Switching over the routing on the network-side does not affect existing communication connections, but only future communication connections. In this case the communication unit KOM2 is first deactivated and the input and output unit MMI is only assigned to the communication unit KOM1 after a possible existing communication connection with the mobile radio network was terminated, after entering into the range covered by the radio network base station.

It is also possible to perform the switch-over only after the terminal has moved into the range covered by a selected radio network base station, and any possible existing communication connection with the mobile radio network was terminated. In that case the communication unit KOM2 would be deactivated in conjunction with the initiation of this switch-over, the communication unit KOM1 would be activated and the input and output unit MMI would be assigned to the communication unit KOM1.

If the radio field evaluation unit RD signals that the field strength of a selected radio network base station has fallen below a predetermined minimum value, and the terminal MT has therefore been moved out of the range covered by this radio network base station, the control unit CONTR causes the network-side routing of connection requests directed to the terminal MT to be switched over by sending signalling messages to the mobile radio network MN via the radio interface RI2. Such connection requests are subsequently routed to the terminal MT via the mobile radio network MN and the radio interface RI2. In conjunction with the initiation of this switch-over, the control unit deactivates the communication unit KOM1, it activates the communication unit KOM2 and assigns the input and output unit MMI to the communication unit KOM2.

If the control unit ascertains that the terminal MT has moved out of the range covered by the radio network base station, and a communication connection still exists to the radio network base station, it is able to send a corresponding warning message to the subscriber B via the input and output unit MMI. In that case it is furthermore possible for the control unit CONTR to wait until the still existing communication connection is terminated, before it initiates the switch-over of the network-side routing.

In that case it is also possible for the control unit to cause such a routing switch-over upon receiving an input command from the subscriber A. This has the advantage that the subscriber can already cause such a switch-over when he intends to leave the range covered by the selected radio network base station. This reduces the danger of interrupting the communication connection when leaving the range covered by the selected radio network base station.

Figure 3A:
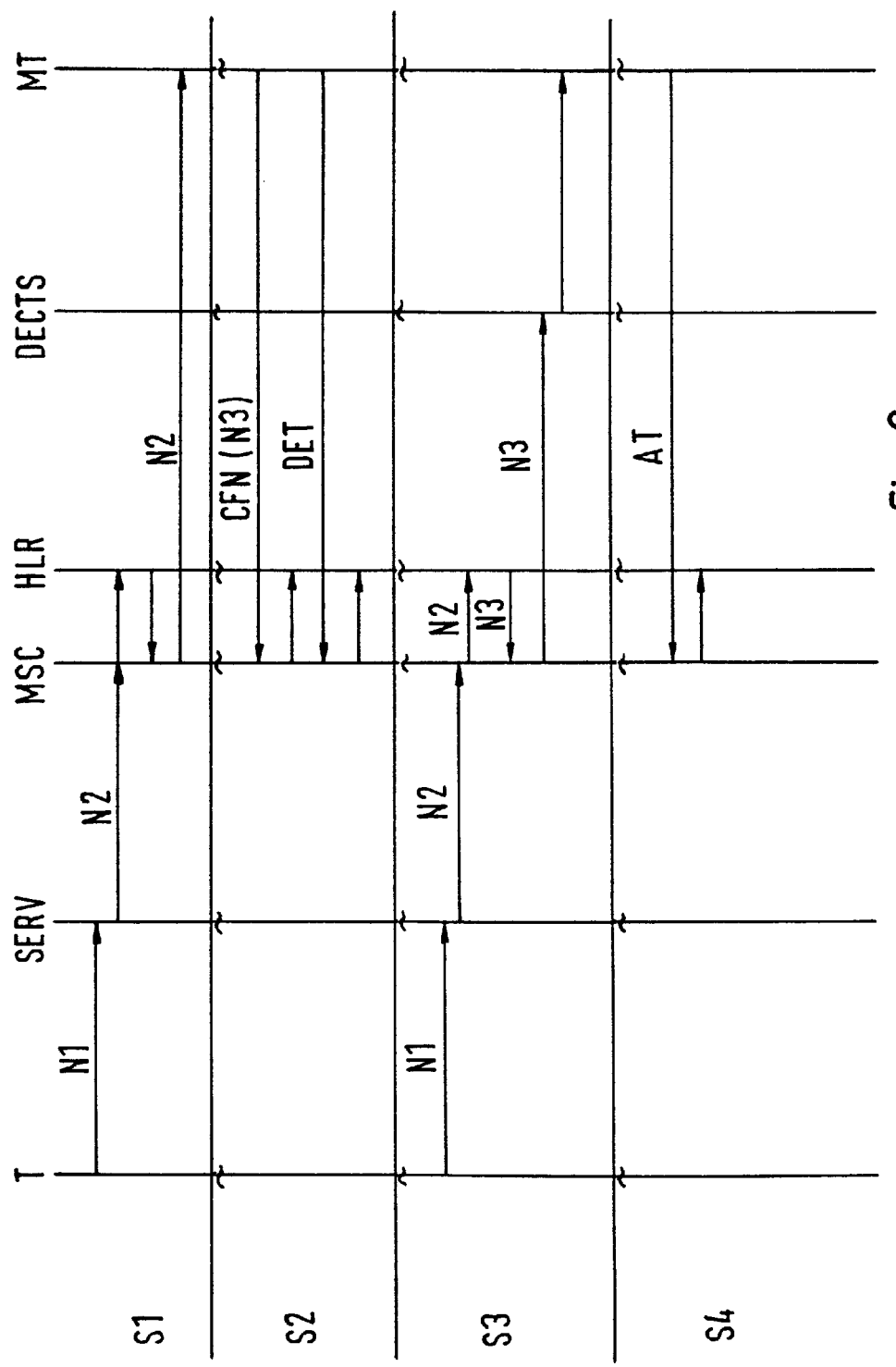
FIG. 3a is a time diagram of a connection to the communication terminal of the invention in accordance with a first embodiment.

A first embodiment is now used to explain a first possibility of establishing a communication connection between the calling terminal T and the called terminal MT, by means of FIG. 3a.

FIG. 3a illustrates four scenarios S1 to S4 of communication sequences between the terminals T and MT, the server unit SERV, the exchange MSC, the home data base HLR and the radio network base station DECT.

In scenario S1, the terminal MT is located outside of the range covered by the radio network base station DECTS.

To establish a connection to subscriber B, subscriber A dials a call number N1, which is a network call number of the communications network PSN. The connection request by means of call number N1 is routed to the service exchange SSP. There the arrival of this connection request triggers the service control device SCP. As a service, the server unit SERV then causes the called number N1 to be translated into a call number N2, and routes the connection request which uses the call number N2 as the called number.

The call number N2 is a mobile radio call number of the mobile radio network MN and addresses the terminal MT within this mobile radio network MN. The connection request is routed to the mobile radio exchange MSC, where the HLR uses the corresponding subscriber data set to perform a test to determine whether or not the terminal MT is registered in the mobile radio network MN. If it is registered, the connection request is routed further to the terminal MT and the connection between the terminal T and the terminal MT is subsequently established.

If the subscriber cannot be reached because he does not want to be reached, the connection request from the communications network PSN to the mobile radio network MN receives a "cannot be reached" notice. If so specified by subscriber B, the server unit SERV now controls whether the connection request should still be routed to the selected radio network base station DECTS, for example so that an answering machine can be reached there, possibly via a second call number of an ISDN connection, or whether the connection request should be routed to a voice mailbox of the server unit SERV.

In scenario S2, the subscriber B with his terminal MT has moved into the range covered by the radio network base station DECTS.

If the control unit CONTR of terminal MT ascertains that the terminal M has moved into the range covered by the selected radio network base station DECTS, it first signals a message CFN(N3) to the mobile radio exchange MSC. The message CFN(N3) signals the exchange MSC to establish a call number N3, which is the call number of the radio network base station DECTS, as an alternative target in the subscriber set of the home data base HLR, for the instance when the terminal MT cannot be reached via the mobile radio network MN. After that the control unit CONTR signals a detach message (DET) to the exchange MSC, which records this status in the subscriber data set of the home data base HLR. Signalling the detach message DET activates the previously established call forwarding. This is followed by a switch-over of the network-side call routing of connection requests directed to the terminal MT, which are now routed to the terminal MT via the radio network base station DECTS.

The establishment of the alternative target represents a service feature of a GSM mobile radio network, so that the terminal MT is now able to access standard mechanisms.

If there are several selected radio network base stations for the terminal MT, the call number of these selected radio network base stations is stored in the terminal. If an entrance into the range covered by a selected radio network base station is ascertained, the respective call number assigned to this selected radio network base station is signalled as an alternative target.

If the terminal is only provided with one selected radio network base station, the respective establishment of an alternative target can be omitted. In that case it is sufficient to establish one time only the selected radio network base station as an alternative target. It is also possible for the subscriber B to carry out the establishment of an alternative target.

In scenario S3, the terminal MT is located in the range covered by the radio network base station DECTS. A connection request with the called number N1 is translated by the server unit SERV into the call number N2, and is routed to the mobile radio exchange MSC. By means of an inquiry to the subscriber data set, it ascertains that the terminal MT to which the call number N2 is assigned is detached, and it then initiates the call forwarding service recorded in the home data base HLR. The latter translates the called number of the connection request into the call number N3 and in this way routes the connection request to the terminal MT via the radio network base station DECTS.

In scenario S4, the subscriber B with his terminal MT moves out of the range covered by the radio network base station DECTS.

If the control unit CONTR of terminal MT ascertains that the terminal MT has moved out of the range covered by the selected radio network base station DECTS, it signals an attach message AT to the exchange MSC, which records this status in the subscriber data set of the home data base HLR. Signalling the attach message AT deactivates the previously established call forwarding. This is followed by a switch-over of the network-side call routing of connection requests directed to the terminal MT, which are now routed to the terminal MT via the radio network base station DECTS.

A second embodiment is used to explain a further possibility of establishing a connection request between the calling terminal T and the called terminal MT by means of FIG. 3b.

FIG. 3b illustrates four scenarios S1' to S4' of communication sequences between the terminals T and MT, the server unit SERV', the exchange MSC, the home data base HLR and the radio network base station DECT. In this case the communication situations in scenarios S1' to S4' correspond to the scenarios S1 to S4.

In scenario S1', the subscriber A dials the call number N1, a connection request with the call number N1 as the called number is routed to the service exchange SSP, where it triggers the control device SCP. By means of an inquiry QR(N2) directed to the home data base HLR, the server unit SERV' then questions the status of terminal MT to which the mobile call number N2 is assigned. The inquiry takes place via a communication connection between the service control device SCP and the home data base HLR, for example via the No. 7 signalling network, or via a packet network according to TCP/IP. It is also possible for the service control device SCP and the home data base HLR to operate on the same software platform, and to use communication mechanisms of this software platform for this inquiry.

A response to the inquiry QR(2) is a response R(AT) signalling that the terminal MT is recorded in the mobile radio network MN. The server unit SERV then translates the called number of the connection request into the call number N2, and the connection request is routed to the terminal MT via the mobile radio network MN as shown in FIG. 3a.

If the subscriber is located outside of the range covered by the radio network base station DECTS and cannot be reached because he does not want to be reached, an inquiry of the "MC Detach" flag in the home data base HLR results in the message "cannot be reached". If so specified by the subscriber, the server unit SERV now controls whether the connection request should for example be routed to an answering machine or to a voice mailbox, or whether a corresponding voice message should be recorded.

In scenario S2', the control unit CONTR of the terminal MT ascertains that the terminal MT has moved into the range covered by the selected radio network base station DECTS and signals the detach message DET to the exchange MSC, which records this status in the subscriber data set of the home data base HLR.

By further signalling the target, it is also possible for the terminal MT to affect the call forwarding via the server unit SERV. To that end the terminal MT changes for example parameters in the home data base HLR and signals the call forwarding target directly to the server unit SERV' via the exchange MSC.

In scenario S3' as in scenario S1', a connection request with the call number N1 is routed as the called number to the service exchange SSP, whereupon the server unit SERV' starts the inquiry QR(N2) to the home data base HLR. A response R(DET) is a response which signals that the terminal MT in the mobile radio network MN is detached. The server unit SERV then translates the called number of the connection request into the call number N3 and routes the connection request to the terminal MT via the radio network base station DECTS.

In this way the status change of the terminal MT in the home data base HLR from "attached" to "detached" causes a switch-over of the routing on the network-side. Now the connection request is no longer routed to the terminal MT via the mobile radio network MN, but rather via the radio network base station DECTS.

In scenario S4', the control unit CONTR of terminal MT ascertains that the terminal MT has moved out of the range covered by the selected radio network base station DECTS and signals the detach message DET to the exchange MSC, which records this status in the subscriber data set of the home data base HLR.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A method of controlling call routing via a communications network to a communication terminal (MT), which terminal is suitable for communicating, in a first mode, via a first radio interface (RI1) with radio network base stations (DECTS) of the communications network, and for communicating, in a second mode, via a second radio interface (RI2) with a mobile radio network (MN) of the communications network, wherein an Intelligent Network (IN) server unit (SERV') of the communications network checks subscriber data stored in the mobile radio network (MN) as to whether the terminal (MT) is recorded there as attached or detached, and activates call forwarding to the selected radio network base station (DECTS) if the terminal (MT) is recorded as being detached; and further comprising the steps of translating, in said Intelligent Network (IN) server unit, a network call number (N1) of a communication request directed to the terminal into a mobile call number (N2) of the terminal, determining, in the terminal (MT), whether it has moved into a range covered by radio network base stations, and if it has moved into a range (RADECT) covered by a selected radio network base station (DECTS), initiating, by signalling via the mobile radio network (MN) to said Intelligent Network server unit (MSC, HLR), a switch-over of network-side routing of connection requests, which are directed to the terminal (MT) by sending an identification of said selected radio network base station and sending a detach message which activates call forwarding to said base station, and routing said connection requests via the selected radio network base station (DECTS), thereby facilitating communication in said first mode.

2. A method as claimed in claim 1, characterized in that, if the terminal (MT) has moved out of the range (RADECT) covered by the selected radio network base station (DECTS), the terminal (MT) initiates a switch-over of the network-side routing of connection requests, which are directed to the terminal (MT), and routes them via the mobile radio network (MN) by signalling the mobile radio network (MN).

3. A method as claimed in claim 1, characterized in that upon an input by a subscriber, the terminal initiates a switch-over of the network-side routing of connection requests, which are directed to the terminal, and routes them via the mobile radio network by signalling the mobile radio network.

4. A method as claimed in claim 1, wherein
the terminal (MT) initiates the switch-over of the routing on the network side and routes calls via the mobile radio network (MN) by signalling an attach message (AT) to a server unit (MSC, HLR) of the mobile radio network which, upon receiving the attach message, deactivates call forwarding to the selected radio network base station.

5. A mobile communication terminal (MT) with a first communication unit (KOM1) for communicating in a first mode with radio network base stations (DECTS), via a first radio interface (RI1), wherein
the communication terminal (MT) is provided with a second communication unit (KOM2) for communicating in a second mode with a mobile radio network (MN) via a second radio interface (RI2), the communication terminal (MT) is provided with a radio field evaluation device (RD) for ascertaining the range covered by radio network base stations, and with a control unit (CONTR) which is designed so that, if the terminal (MT) has moved into the range (RADECT) covered by a selected radio network base station (DECTS), the control unit in said terminal initiates, by signalling via the mobile radio network (MN) to an Intelligent Network (IN) server unit (MSC, HLR) of said network, a switch-over of network-side routing of connection requests which are directed to the terminal (MT) by causing said Intelligent Network (IN) server, forming part of said communications network, to change an attach/detach status of said terminal in a subscriber database, to call-forward by translating a network call number (N1) of a communication request directed to the terminal, into a mobile call number (N2) of the terminal, and to route the communication requests via the selected radio network base station (DECTS), thereby facilitating communication in said first mode.

* * * * *

UNITED STATES PATENT AND TRADEMARK OFFICE
CERTIFICATE OF CORRECTION

PATENT NO.      : 6,321,096 B2                                              Page 1 of 1
DATED           : November 20, 2001
INVENTOR(S)     : Lautenschlager et al.

It is certified that error appears in the above-identified patent and that said Letters Patent is hereby corrected as shown below:

<u>Title page,</u>
Item [56], References Cited, FOREIGN PATENT DOCUMENTS, cancel
"196505223" and substitute -- 19605233 -- therefor.

<u>Column 8,</u>
Line 64, delete "characterized in that," and substitute -- wherein -- therefor.
Line 67, after "initiates", insert -- , by signalling via the mobile radio network, --.

<u>Column 9,</u>
Lines 3-4, delete "by signalling the mobile radio network (MN)".
Line 5, delete "characterized in that" and substitute -- wherein -- therefor.
Line 6, after "initiates", insert -- , by signalling via the mobile radio network, --.
Line 8, delete "them" and substitute -- calls -- therefor.
Line 9-10, delete "by signalling the mobile radio network" and substitute -- , thereby facilitating communication in said second mode -- therefor.

Signed and Sealed this

Nineteenth Day of November, 2002

*Attest:*

JAMES E. ROGAN
*Attesting Officer*         *Director of the United States Patent and Trademark Office*